United States Patent [19]

Watari

[11] Patent Number: 4,587,091
[45] Date of Patent: May 6, 1986

[54] NUCLEAR FUEL ASSEMBLY

[75] Inventor: Yoshio Watari, Katsuta, Japan

[73] Assignee: Hitachi, Ltd., Tokyo, Japan

[21] Appl. No.: 365,093

[22] Filed: Apr. 2, 1982

[30] Foreign Application Priority Data

Apr. 8, 1981 [JP] Japan .................................. 56-51806

[51] Int. Cl.⁴ .............................................. G21C 3/30
[52] U.S. Cl. ..................................... 376/434; 376/457
[58] Field of Search ............... 376/434, 438, 457, 906, 376/436

[56] References Cited

U.S. PATENT DOCUMENTS

| | | | |
|---|---|---|---|
| 2,841,545 | 7/1958 | Zinn | 376/434 X |
| 3,029,198 | 4/1962 | Anderson et al. | 376/434 X |
| 3,238,108 | 3/1966 | Deddens et al. | 376/434 X |
| 3,267,000 | 8/1966 | Ashcroft et al. | 376/434 X |
| 3,409,502 | 11/1968 | Barker | 376/434 X |
| 3,466,225 | 9/1969 | MacPhee | 376/434 X |
| 3,713,974 | 1/1973 | Previti et al. | 376/442 X |
| 4,011,133 | 3/1977 | Bloom et al. | 376/457 |
| 4,325,786 | 4/1982 | Wohlsen | 376/462 X |

OTHER PUBLICATIONS

"Nuclear Reactor Engr.", Glasstone et al, 1981.
"Analytical Method of Fuel Pin Deformations in LMFBR Assembly", pp. 23-36, *Nuclear Sci. and Technology*, Nov. 77, pp. 791-804, Miki.
"Deformation Analysis of Fuel Pins within the Wire Wrap Assembly of an LMFBR", *Nuclear Eng. and Design*, vol. 52, No. 3, May 79, pp. 371-382, Miki.

*Primary Examiner*—Deborah L. Kyle
*Assistant Examiner*—Dan Wasil
*Attorney, Agent, or Firm*—Antonelli, Terry & Wands

[57] ABSTRACT

A nuclear fuel assembly suitable for use in fast breeders. The fuel assembly has a wrapper tube and a plurality of fuel elements contained in the wrapper tube, each fuel element having a clad tube. The wrapper tube is made of a material which exhibits a larger rate of swelling by neutron irradiation than the material of the clad tube. For instance, the wrapper tube is made of an austenitic stainless steel, and the clad tube is made of an austenitic Ni alloy having a high Ni content. According to this arrangement, it is possible to avoid undesirable contact between the clad tube and the wrapper tube in the last period of the life time of the nuclear fuel.

3 Claims, 15 Drawing Figures

FIG. 4 a ———— INITIAL PERIOD OF EQUILIBRIUM CYCLE b ---- LAST PERIOD OF EQUILIBRIUM CYCLE

NUCLEAR FUEL ASSEMBLY

FIELD OF THE INVENTION

The present invention relates to a nuclear fuel assembly and, more particularly, to a nuclear fuel assembly suitable for use in, for example, large-scale fast breeders.

BRIEF DESCRIPTION OF THE DRAWINGS

FIG. 3b is a sectional view taken along the line A—A of FIG. 3a;

DESCRIPTION OF THE PRIOR ART

Figure 1:
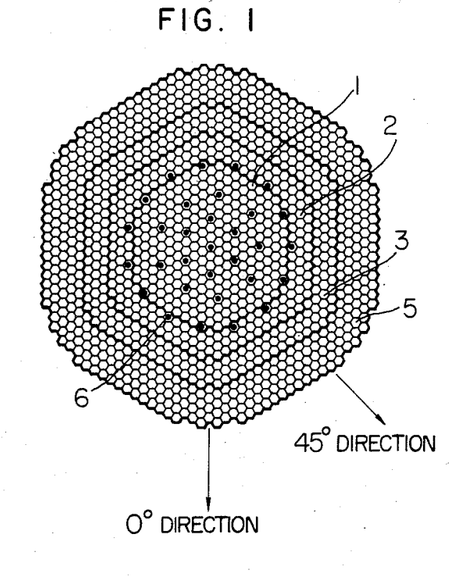
FIG. 1 is a cross-sectional view of the core of a fast breeder.
Figure 2:
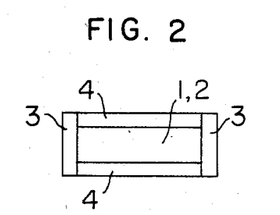
FIG. 2 is a vertical sectional view of the fast breeder shown in FIG. 1.

Referring first to FIGS. 1 and 2, the core of a fast breeder consists of an inner core region 1 and an outer core region 2 of different plutonium enrichments in order to flatten the power distribution. The core is surrounded by radial blankets 3, axial blankets 4 and neutron shielding body 5. Control rods 6 for controlling the power of the nuclear reactor are placed in the inner core region 1 and the outer core region 2. These constituents are respectively inserted into a channel box 7 which is usually referred to as "wrapper tube" and constitute the core portion.

Figure 3A:
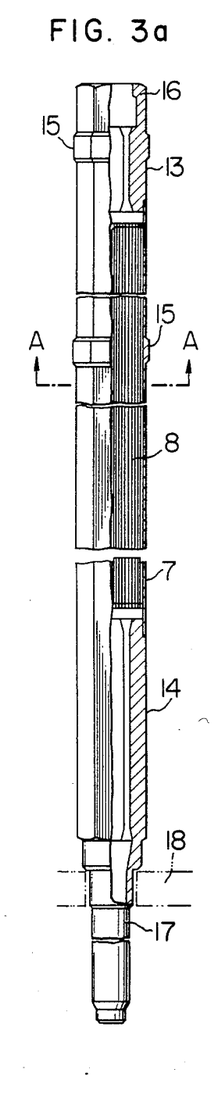
FIG. 3a is a partly cut-away side elevational view of a fuel assembly.
Figure 3B:
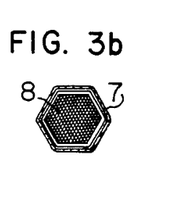
Figure 3C:
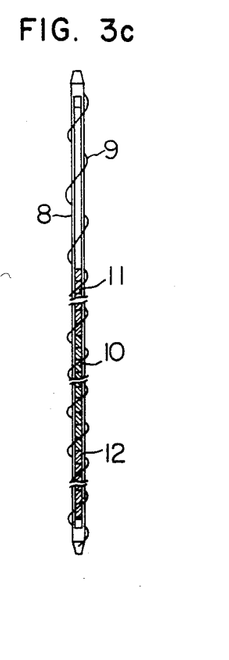
FIG. 3c is an enlarged side elevational view of a fuel element.

Referring now to FIGS. 3a, 3b and 3c which show the concept of a fuel assembly, there are 271 (two hundred and seventy one) fuel elements 8 held in the wrapper tube 7 with wires 9 interposed therebetween. Each fuel element 8 contains therein core fuel pellets 10, upper blanket fuel pellets 11 and lower blanket fuel pellets 12. An upper neutron shielding member 13 and a lower neutron shielding member 14 are disposed at the upper and lower sides of the fuel elements 8, respectively.

The wrapper tube has a tendency to expand due to thermal expansion, swelling by neutron irradiation and so forth. In order to prevent the contact between adjacent wrapper tubes due to expansion, a spacer pad 15 is disposed at the upper part of the wrapper tube 7. The wrapper tube 7 itself is supported by a core support plate 18. An entrance nozzle 17 constitutes a passage of coolant flowing into the wrapper tube 7. A handling head 16 for exchange of fuel is disposed at the upper side of the wrapper tube 7.

Figure 4:
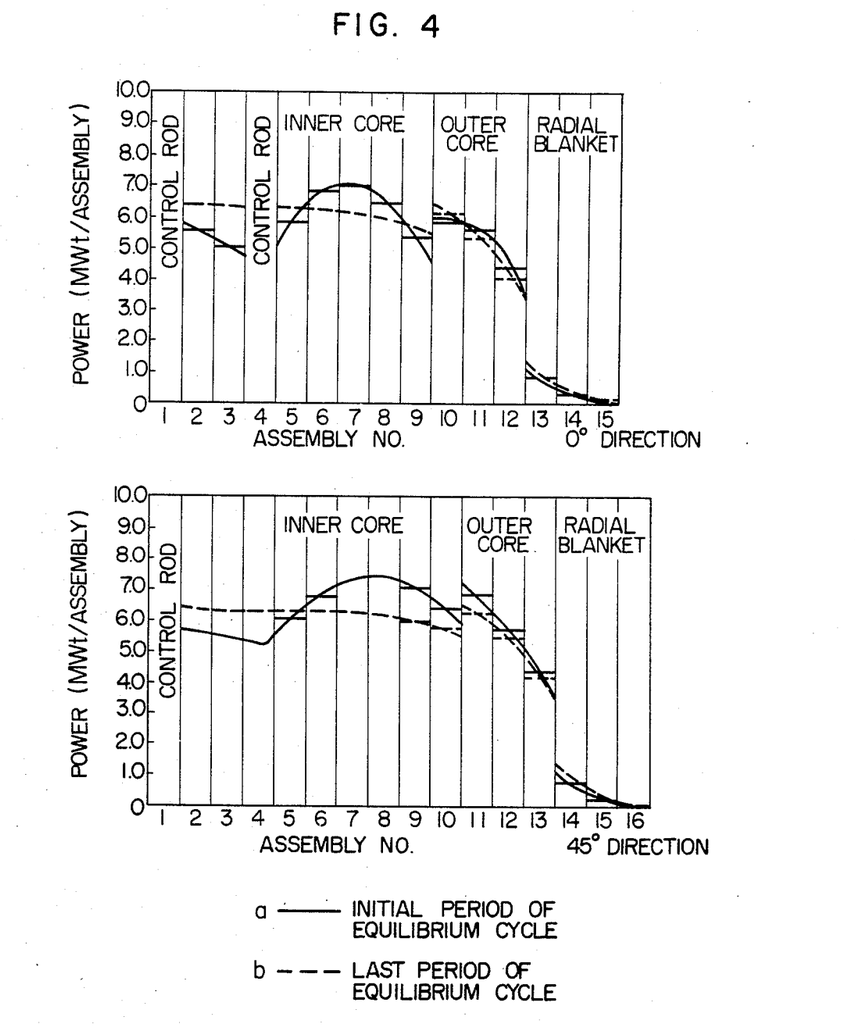
FIG. 4 is a diagram showing radial power distribution.

FIG. 4 shows the power distributions of the fast breeder in the radial directions 0° and 45° in FIG. 1. In FIG. 4, a curve (a) shows the power distribution in the initial period of the equilibrium cycle, while a curve (b) shows the power distribution in the last period of the equilibrium cycle. The assembly Nos. in this Figure is determined as follows. Namely, firstly No. 1 is imparted to the control rod 6 positioned at the center of the inner core region 1 shown in FIG. 1, and numbers such as No. 2, No. 3 and so forth are imparted to successive assemblies in each of the 0° direction and 45° direction.

Figure 5:
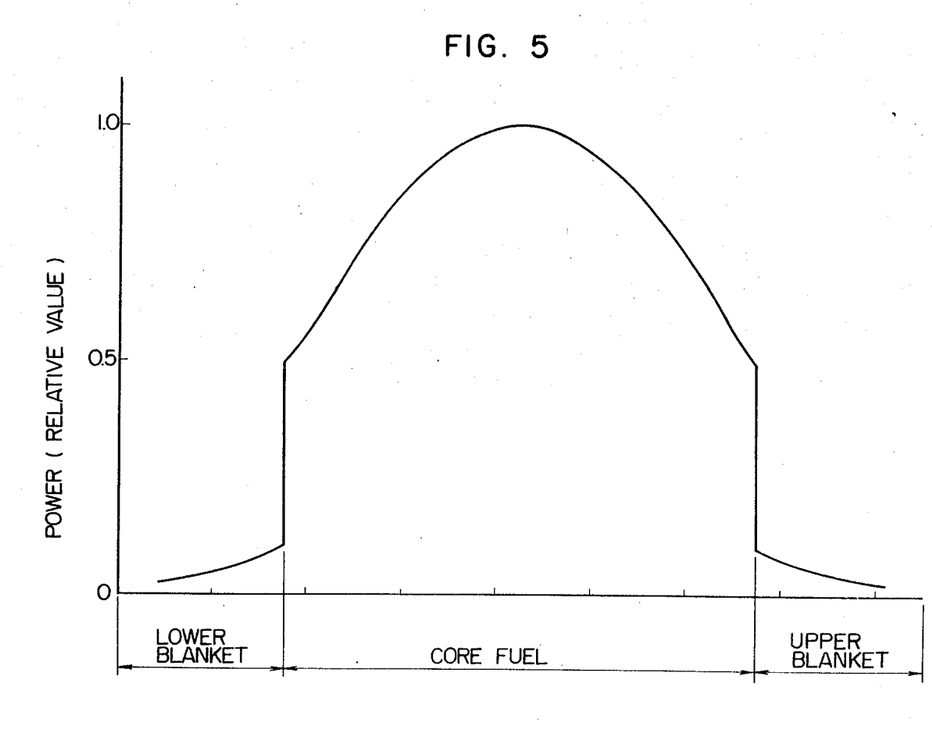
FIG. 5 is a diagram showing axial power distribution.
Figure 6:
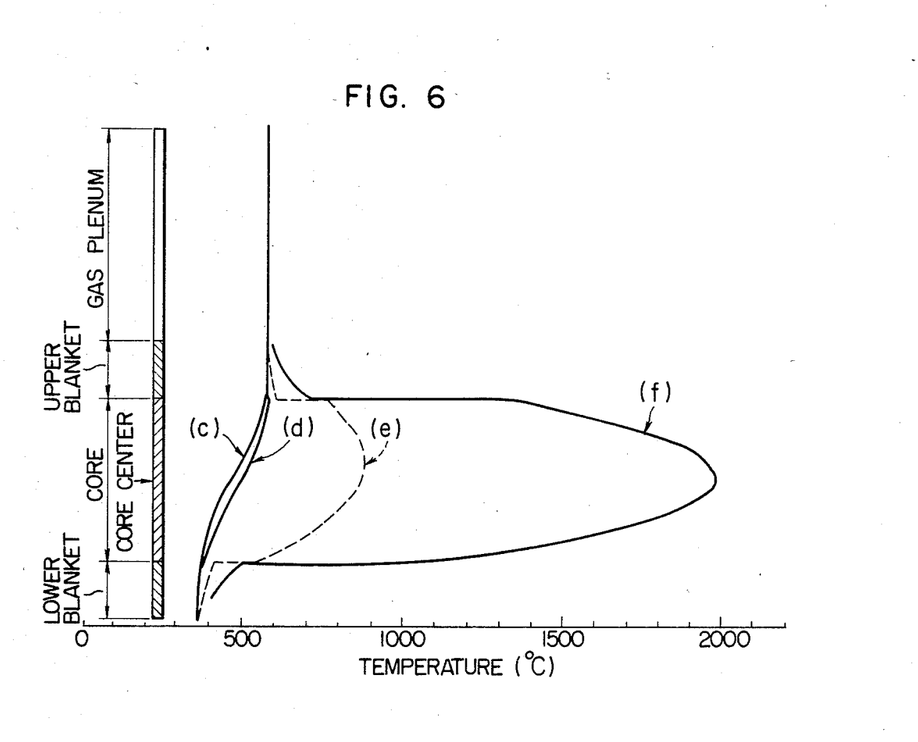
FIG. 6 is a diagram showing axial temperature distribution of a core fuel element, calculated from the radial power distribution and axial power distribution shown in FIGS. 4 and 5.

FIG. 5 shows the axial power distribution of the core fuel assembly. By these power distributions shown in FIGS. 4 and 5, the fuel element in the core fuel assembly brings about an axial temperature distribution shown in FIG. 6. In this Figure, a curve (c) shows the coolant temperature, a curve (d) shows the temperature at the thicknesswise center of the wall of clad tube, a curve (e) shows the surface temperature of the fuel pellet and a curve (f) shows the temperature at the center of the fuel pellet.

Figure 7:
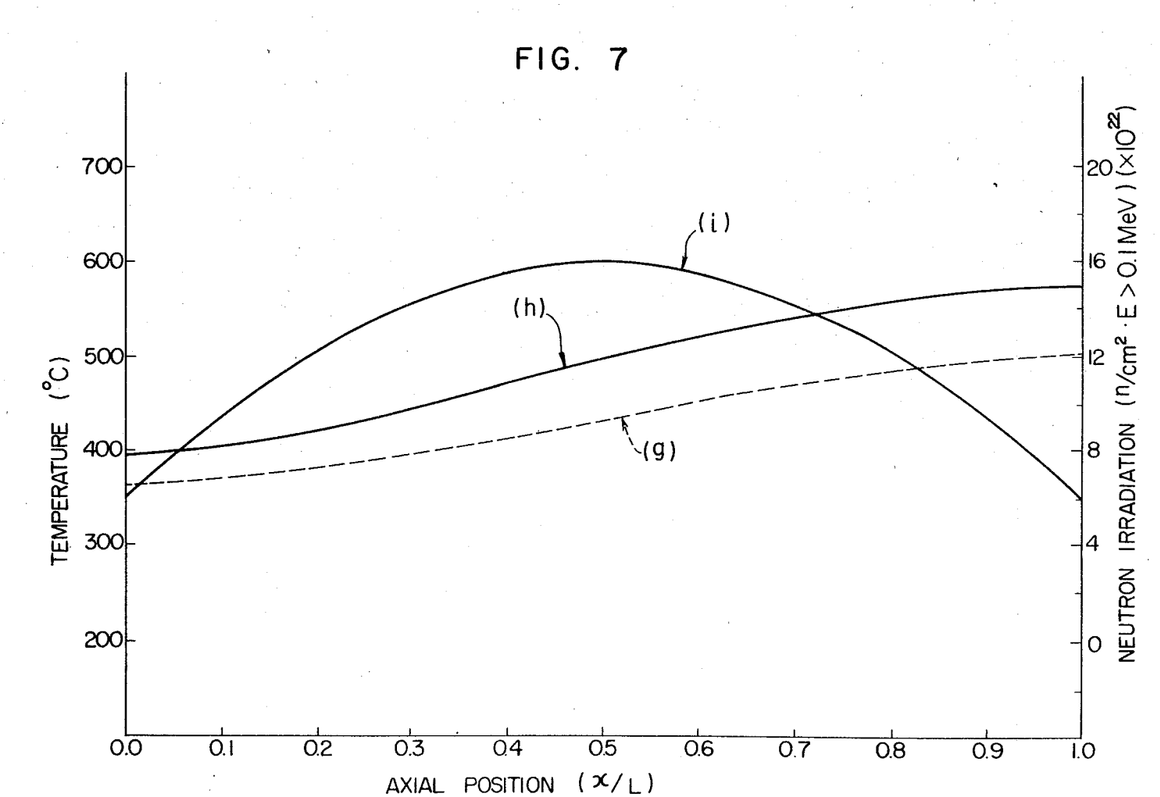
FIG. 7 is a diagram showing conditions of irradiation on a wrapper tube and a clad tube.
Figure 8:
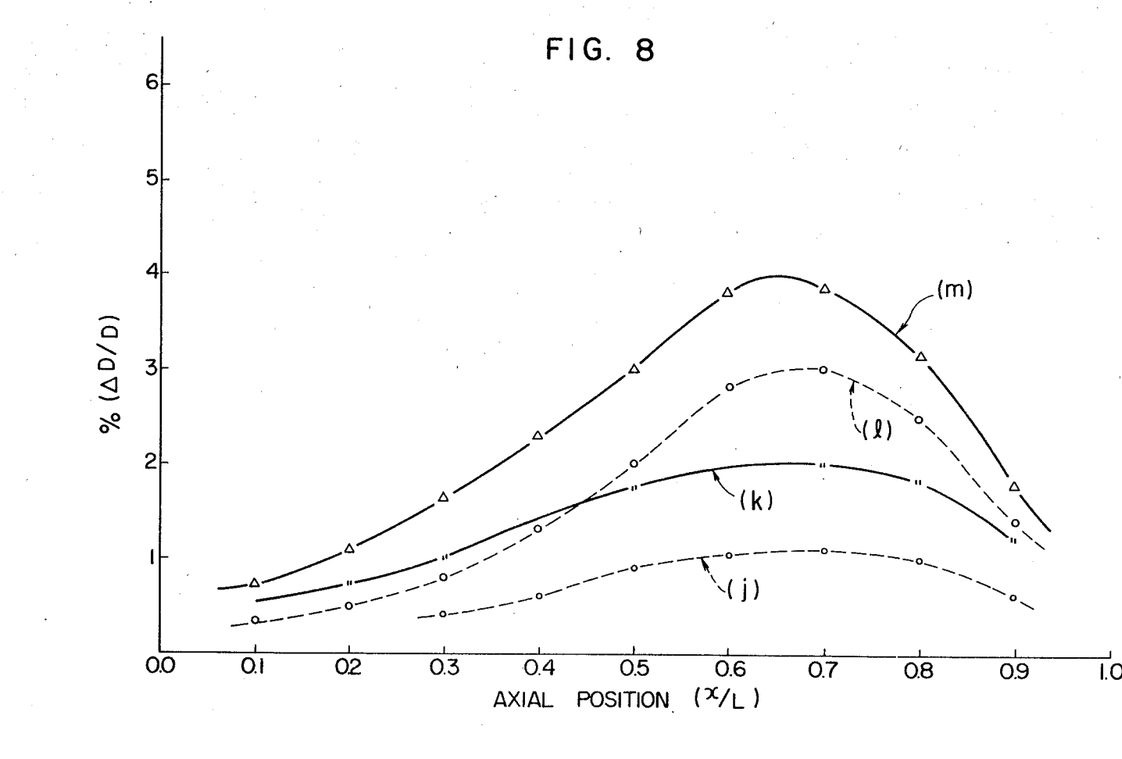
FIG. 8 is a diagram showing change in outside diameters of the wrapper tube and the clad tube analyzed in accordance with the irradiating condition shown in FIG. 7.

FIG. 7 shows the axial temperature distribution of the wrapper tube (curve g), axial temperature distribution of clad tube (curve h), and axial distribution of fast neutron irradiation on the wrapper tube and clad tube (curve i). From this Figure, it will be seen that between the wrapper tube and the clad tube there is a temperature difference of about 50° to 100° C., although they are subjected to the same neutron irradiation. As the wrapper tube and the clad tube of the fuel element are irradiated by the neutron, a difference is caused between the amount of swelling of the wrapper tube and that of the clad tube, because the temperature of the wrapper tube is 50° to 100° C. lower than that of the clad tube as stated above. In consequence, the wrapper tube and the clad tube exhibit changes in outside diameters as illustrated in FIG. 8, at the last period of the life time. In this Figure, a curve (j) exhibits the change in the outside diameter of the wrapper tube due to the swelling, while a curve (k) shows the change in the outside diameter of the wrapper tube due to thermal expansion and swelling. Also, a curve (l) shows the change in the outside diameter of the clad tube due to the swelling, while a curve (m) shows the change in the outside diameter of the clad tube due to thermal expansion and swelling. Therefore, the amount of change in the outside diameter of the clad tube is greater than that of the wrapper tube, so that there is a possibility that the clad tube and the wrapper tube contacts in the fuel assembly.

Figure 9:
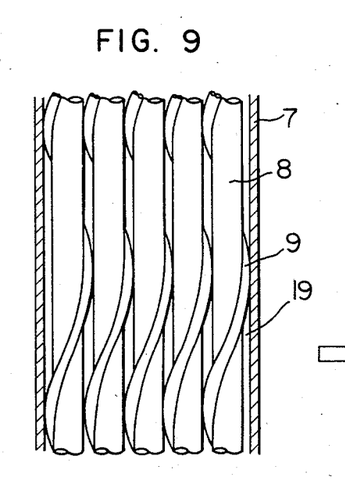
FIG. 9 is a vertical sectional view of a fuel assembly in the initial period of life time.
Figure 10:
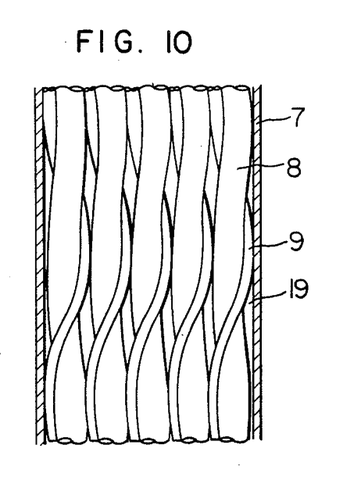
FIG. 10 is a vertical sectional view of the fuel assembly in the last period of the life time.

FIGS. 9 and 10 shows this state schematically. Namely, FIG. 9 shows the state of the fuel assembly in the initial period of the life time. It will be seen that there is a distinct gap between the fuel element 8 and the wrapper tube 7 in this state. On the other hand, FIG. 10 shows the state of the fuel assembly in the last period of the life time. As a result of the swelling of the clad tube of the fuel element due to the fast neutron irradiation, the gap between the fuel element and the wrapper tube is eliminated almost completely. This in turn makes it difficult to remove the heat from the fuel element by the coolant 19 and, hence, imposes a fear of burn-out of the fuel element.

Figure 11:
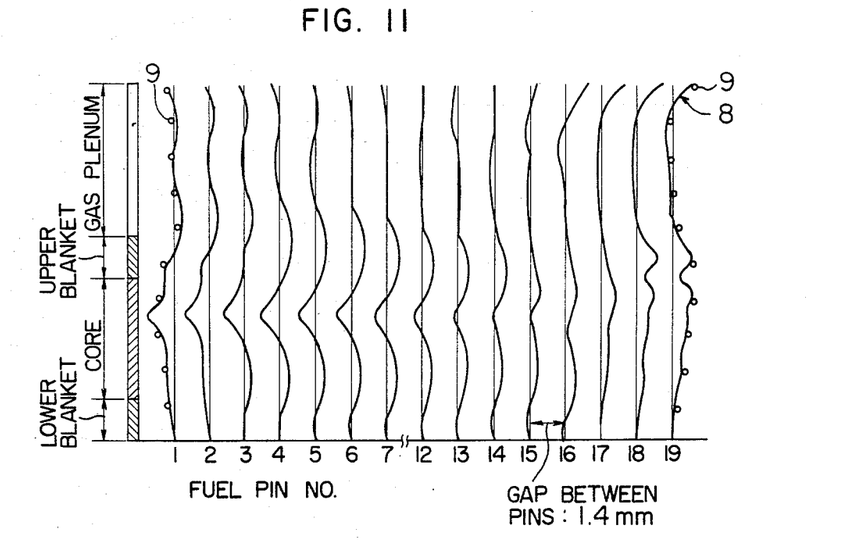
FIG. 11 is an illustration of the changes in central axes of fuel elements in the fuel assembly in the last period of the fuel life time.

FIG. 11 shows the displacements of the central axes in the fuel elements 8 in the last period of life time of the fuel assembly shown in FIG. 3. In the last period of the life time, the fuel element exhibits a complicated behaviour because of swelling due to neutron irradiation and because of a creep.

Thus, in the conventional fuel assembly, there is a fear that the fuel element and the wrapper tube contact each other in the last period of the life time, unless a sufficiently large gap is maintained between the fuel element and the wrapper tube in the initial period of the life time. A too large gap between the fuel element and the wrapper tube, however, dangerously permits the vibration of the fuel element due to the flow of the coolant, resulting in various troubles such as mutual contact between adjacent fuel elements and collision between the fuel element and the wire spacer to damage the fuel elements, i.e. to cause so-called fretting corrosion.

Hitherto, the following countermeasure has been taken in order to overcome the above-described problems.

Namely, the behaviours of the fuel element and the wrapped tube largely depend on the swelling deformation (expansion deformation) attributable to the neutron irradiation. Therefore, while a 20% cold-worked stainless steel AISI 316 has been used conventionally, the Ni content is somewhat increased and Cr content is somewhat decreased in the stainless steel in order to improve the anti-swelling property, resistance to swelling.

Figure 12:
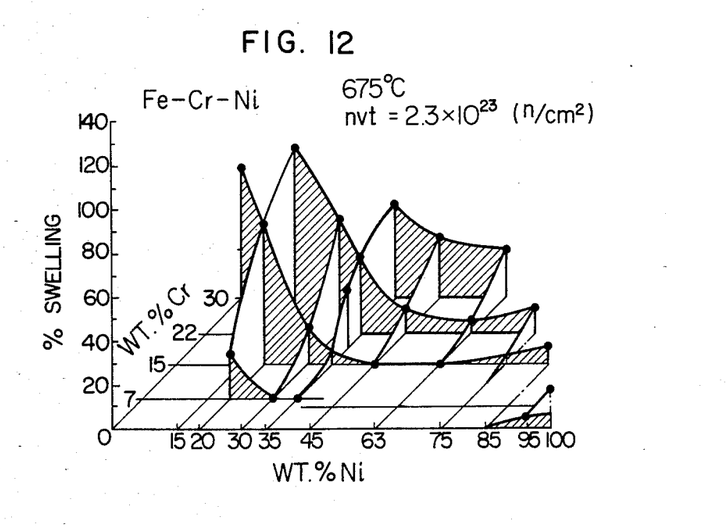
FIG. 12 is a diagram showing the relationship between swelling and Cr and Ni contents in an Fe-Cr-Ni system alloy.

FIG. 12 shows how the swelling of an Fe-Cr-Ni system alloy is influenced by the Cr content and Ni content. From this Figure, it will be seen that the Cr content is made as small as possible while the Ni content preferably falls between 30 and 80 wt % for reducing the swelling. Under this circumstance, countries advanced in this field of technology are developing Ni alloys having high Ni content as the material suitable for fuel assembly of high breeding ratio and high degree of burn-up.

Figure 13:
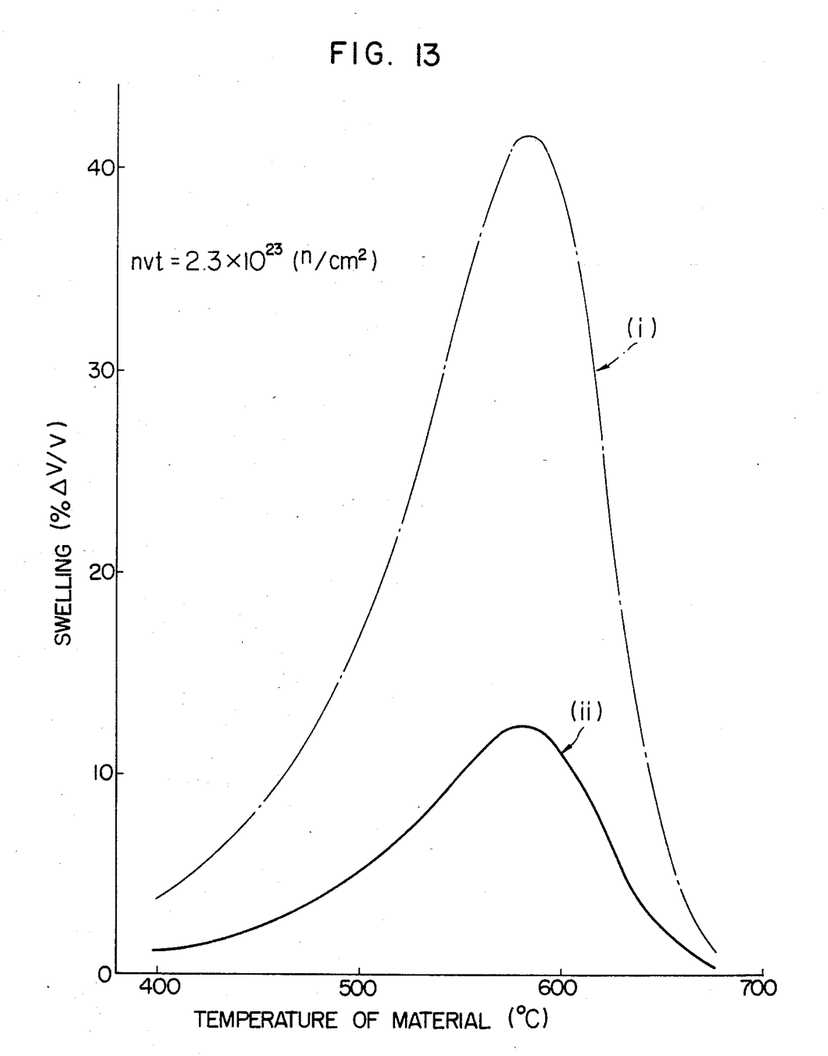
FIG. 13 is a diagram showing swelling properties of the wrapper tube material and the clad tube material.

Rates of swelling of the above-mentioned materials, under neutron irradiation at a rate of $2.3 \times 10^{23}$ n/cm$^2$, are shown in FIG. 13. More specifically, a curve (i) shows the swelling rate of AISI 316 stainless steel, while a curve (ii) shows the swelling rate of high Ni alloy. It will be seen that the rate of swelling of the Ni alloy is as small as about ⅓ of that of the AISI 316 stainless steel. The maximum rate of swelling is observed when the material temperature is about 580° C. Namely, at this temperature, the AISI stainless steel exhibits a volumetric expansion of about 42%, while the high Ni alloy exhibits a volumetric expansion of about 12%.

As has been described, conventionally, the contents of elements such as Ni are suitably adjusted to suppress the swelling, thereby to eliminate the possibility of contact between the fuel element and the wrapper tube in the last period of the fuel life time.

Attention must be drawn here, however, to the fact that, as will be seen from the following Table 1, the neutron capture cross-section of Ni is two to three times as large as those of Fe and Cr, so that the increased Ni content in the stainless steel undesirably increases the wasteful absorption of neutron. This inconveniently deteriorates the breeding ratio which is the greatest advantage of the fast breeders.

TABLE 1

| Value | Comparison of Neutron Capture Cross Section Material | | | |
|---|---|---|---|---|
| | Fe | Cr | Ni | Na |
| Cross-section (b) | 0.006 | 0.005 | 0.014 | 0.0006 |

SUMMARY OF THE INVENTION

Accordingly, an object of the invention is to overcome the above described problems of the prior art.

To this end, according to the invention, there is provided a nuclear fuel assembly suitable for use in fast breeders intended for high breeding ratio and high degree of burn-up, characterized in that a material which exhibits a comparatively large swelling is used as the material of the wrapper tube, while a material which exhibits only a small swelling is used as the material of the clad tube of each fuel element.

DESCRIPTION OF THE PREFERRED EMBODIMENT

A preferred embodiment of the invention will be described hereinunder with reference to FIGS. 3a, 3b and 3c. Referring to these Figures, the wrapper tube 7 is made of a material having a comparatively large rate of swelling, e.g. 20% cold-worked AISI 316 stainless steel, while the clad tube of each fuel element 8 is made from a high Ni alloy having an Ni content of, for example, 30 to 80 wt %.

As will be seen from FIG. 7, the temperature (g) of the wrapper tube is lower than the temperature (h) of the clad tube. Namely, the temperatures of the wrapper tube and the clad tube are about 430° C. and about 500° C., respectively, at the portion of the highest intensity of the neutron irradiation. On the other hand, the rate of swelling due to the neutron irradiation is largely affected by the material temperature, as shown in FIG. 13.

For instance, the curve (i) in FIG. 13 shows that, as in the present invention when the AISI 316 stainless steel is used as the material of the wrapper tube, the wrapper tube at 430° C. exhibits a swelling rate of about 6% by volume under the neutron irradiation of $2.3 \times 10^{23}$ n/cm$^2$. Meanwhile, the clad tube made of a high Ni alloy exhibits at 500° C. a swelling rate of about 5% by volume under the neutron irradiation of the same rate, as will be understood from the curve (ii) in FIG. 13.

On the other hand, if a material exhibiting small swelling consisting of a high Ni alloy is used as the material of both of the wrapper tube and the clad tube as in the case of the prior art, the wrapper tube at 430° C. exhibits a swelling of about 2% while the clad tube at 500° C. exhibits a swelling of about 5%, respectively, in the last period of the life time. Thus, the clad tube exhibits a swelling exceeding that of the wrapper tube. Therefore, there is a possibility that the clad tube undesirably contacts the wrapper tube in the last period of the life time, even though high Ni alloy exhibiting small swelling is used as the material of these tubes, unless a sufficiently large gap is formed in the initial period between the clad tube and the wrapper tube.

According to the invention, since the wrapper tube always exhibits a swelling rate greater than that of the clad tube, there is no possibility of contact between the clad tube and the wrapper tube, even in the last period of the life time.

In addition, the wasteful absorption of neutron by the wrapper tube is decreased because in the fuel assembly according to the invention, the wrapper tube is made of AISI 316 steel in which the content of Ni, which has a large neutron capture cross-section, is in the order of 10%. In consequence, the breeding performance is much improved as compared with the conventional fuel assembly in which both of the wrapper tube and the clad tube are made from an Ni alloy having a high Ni content.

Incidentally, in order to avoid undesirable contact between adjacent wrapper tubes, it may suffice to set, in the initial period of the life time, a gap sufficiently large to avoid the mutual contact between adjacent wrapper tubes in the last period of the life time. Such a gap may cause only an increase in the flow rate of the coolant (Na) flowing through the gap between the adjacent wrapper tubes, but this does not cause any problem concerning the neutron economy because as shown in Table 1 sodium (Na) makes only a small wasteful absorption of neutron.

As will be understood from the foregoing description, according to the invention it is possible to obtain a highly safe and economical nuclear reactor, by means of skillfully utilizing the difference in the swelling properties between the wrapper tube and the fuel clad tube due to the difference in temperature therebetween.

Although the invention has been described with specific reference to the fuel assemblies which are held by wire spacers as shown in FIGS. 3a to 3c, it will be clear to those skilled in the art that the invention can equally be applied to such a case where the fuel assemblies are held by a grid type spacer.

To sum up, the present invention offers the following advantages.

(1) The undesirable mutual contact between the wrapper tube and the fuel element during the life time of the nuclear fuel is avoided because the wrapper tube is made of a material having a larger rate of swelling than that of the material of the clad tube of the fuel element.

(2) The material exhibiting a large swelling has a small content of Ni which wastefully absorbs the neutron, as compared with the material exhibiting a small swelling. In consequence, the use of this material only for the wrapper tube decreases the wasteful absorption of neutron thereby improving the neutron economy and breeding performance.

(3) For the reasons (1) and (2) mentioned above, it is possible to obtain a nuclear fuel assembly which is more economical and more safe than the conventional fuel assemblies.

What is claimed is:

1. A fuel assembly having a wrapper tube and a plurality of fuel elements contained in said wrapper tube, each fuel element having a clad tube, characterized in that said wrapper tube is made of a material which exhibits a larger rate of swelling by neutron irradiation than the material of said clad tube, said wrapper tube being made of austenitic stainless steel, and said clad tube is made of an austentitic Ni alloy containing 30 to 80 wt % of Ni for reducing swelling by neutron irradiation to thereby utilize an alloy having a higher resistance to swelling by neutron irradiation than said austenitic stainless steel.

2. A fuel assembly, having a wrapper tube and a plurality of fuel elements contained in said wrapper tube, each fuel element having a clad tube, said assembly adapted for use under conditions that said clad tube is at a higher temperature than the temperature of said wrapper tube, characterized in that said wrapper tube is made of a material which exhibits a larger rate of swelling by neutron irradiation at the temperature of said wrapper tube during the use of the fuel assembly than the material of said clad tube at said higher temperature, said wrapper tube being made of an austenitic stainless steel, and said clad tube is made of an austenitic Ni alloy containing 30 to 80 wt % of Ni for reducing swelling by neutron irradiation, to thereby utilize an alloy having a higher resistance to swelling by neutron irradiation than said austenitic stainless steel.

3. A fuel assembly as claimed in claim 2, wherein the fuel assembly is adapted for use in a fast breeder, wherein, during operation of said fast breeder, said clad tube is at a higher temperature than the temperature of said wrapper tube.

* * * * *